United States Patent [19]

Mock

[11] Patent Number: 4,645,076
[45] Date of Patent: Feb. 24, 1987

[54] REEL COVER

[75] Inventor: Donald E. Mock, San Dimas, Calif.

[73] Assignee: Kirkhill Rubber Co., Brea, Calif.

[21] Appl. No.: 772,332

[22] Filed: Sep. 3, 1985

[51] Int. Cl.[4] .............................................. B65D 85/66
[52] U.S. Cl. ..................................... 206/400; 206/404
[58] Field of Search ............... 206/400, 403, 404, 406; 220/306

[56] References Cited

U.S. PATENT DOCUMENTS

| | | | |
|---|---|---|---|
| 1,497,236 | 6/1924 | Happe | 206/400 |
| 3,095,969 | 7/1963 | Morrison | 206/400 |
| 3,311,228 | 3/1967 | Kulka | 206/400 |
| 3,667,595 | 6/1972 | Posso | 206/400 |
| 3,735,863 | 5/1973 | Osojnak | 206/400 |
| 3,836,094 | 9/1974 | Hollingsworth | 206/400 |
| 3,921,798 | 11/1975 | Dean et al. | 206/400 |
| 3,939,977 | 2/1976 | Price et al. | 206/400 |
| 3,998,325 | 12/1976 | Kulka | 206/400 |
| 4,333,563 | 6/1982 | Hansand et al. | 206/400 |

Primary Examiner—Joseph Man-Fu Moy
Attorney, Agent, or Firm—Edward D. O'Brian

[57] ABSTRACT

A reel cover which is primarily intended to be used in enclosing the space between the sides of a reel can be constructed from a single extruded strip of a polymer such as plasticized polyvinyl chloride. Such a strip as formed will have parallel ridges on its under surface which are adapted to fit against the sides of the reel. The cover is formed from the extruded strip by punching out openings in terminal portions in the ends of the strip so that portions of the ridges remain on these terminal portions. The openings and the remaining ridges are dimensioned so that one terminal portion may be placed over the other and the two terminal portions can then be attached by pushing the remaining ridges on one terminal portion through the openings on the other terminal portion.

7 Claims, 5 Drawing Figures

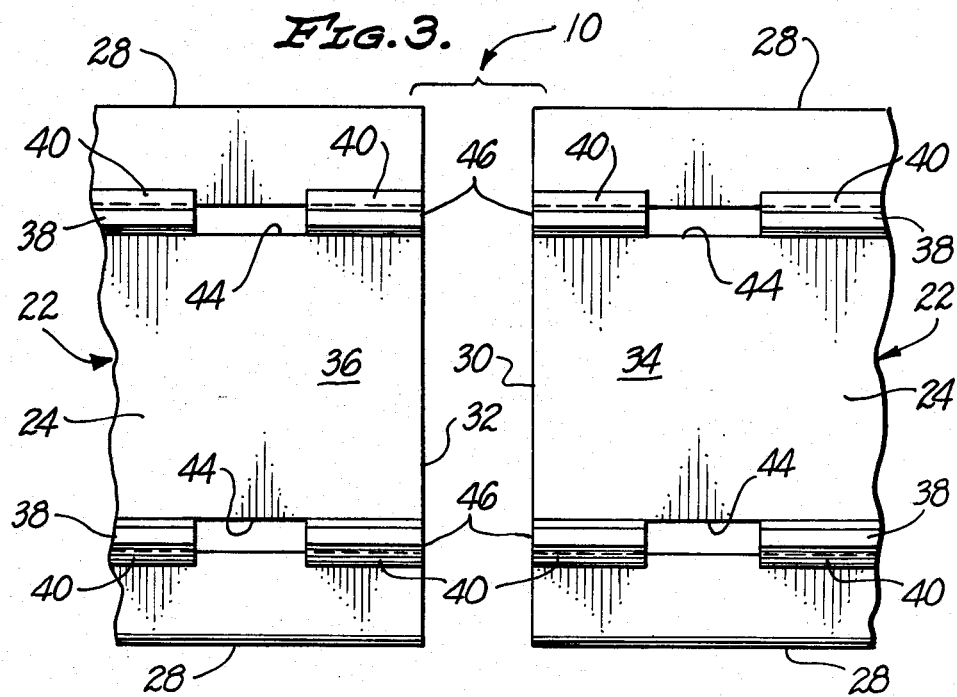
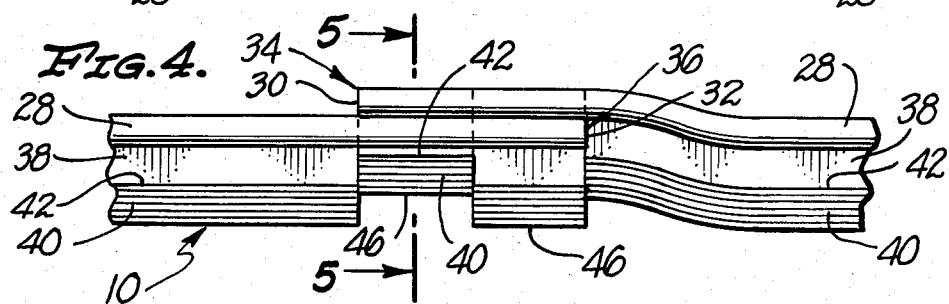
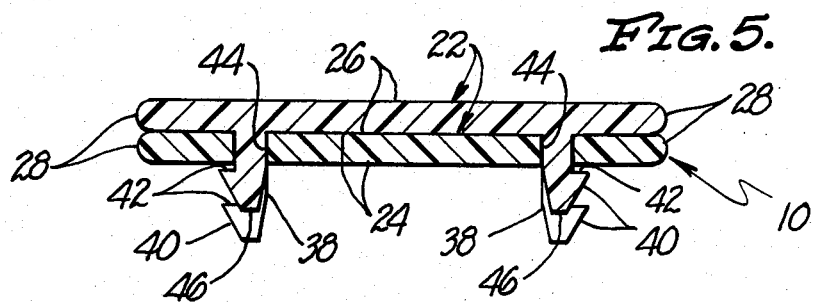

4,645,076

REEL COVER

BACKGROUND OF THE INVENTION

The invention set forth in this specification pertains to new and improved reel covers.

The term "reel" as used in this specification is intended to designate a spool or spool-like structure having parallel, circular, disk-like sides which are connected in axial alignment with one another through the use of a central hub, hub-like or similar structure. Devices of the type indicated in this last sentence are commonly referred to as "reels" because of the fact that strands of various materials or tapes and the like are "reeled" on to them for storage and similar purposes.

On many occasions the articles located on such reels need to be protected from various ambient contaminants. Thus, for example, when such reels are utilized to hold magnetic storage tapes for computer and related uses, it is highly desirable to protect such tapes from any form of contamination. This is accomplished by locating such tapes in a reel or reel structures which is imperforate so that dust and ambient cannot permeate the reel. In the past such imperforate reels have been utilized with a variety of bands or band-like structures intended to hold the contents of the reel in place and to at least a degree to protect such contents. Even common elastomeric or rubber bands have been used for this latter purpose.

SUMMARY OF THE INVENTION

The present invention is intended to provide new and improved reel covers for protecting the contents of an imperforate reel from contamination by ambient particles or gasses. More specifically the invention is intended to provide reel covers having the utility indicated which are quite desirable because they can be manufactured comparatively easily at a very nominal cost and which, although they are comparatively inexpensive, are of such a character that they can be easily and conveniently utilized and which are of such a character that they are very effective for their intended purpose.

In accordance with this invention these various objectives are achieved by providing: a reel cover for use in enclosing the periphery of a reel, said reel having aligned circular sides, said reel cover comprising: an elongated strip of a flexible, self-supporting material, said strip having an under surface and an outer surface extending between side edges and first and second ends, said strip being sufficiently long so that when it is located around said reel a portion of said first end of said strip will overlie a portion of said second end of said strip with the under surface of said portion of said first end being located against the outer surface of said portion of said second end, said portion of said second end including opening means extending there through between its outer and under surfaces, said opening means being spaced from said second end, said portion of said first end including projection means extending from its under surface, said projection means being capable of being fitted within said opening means of said portion of said second end so as to hold said ends with respect to one another when said reel cover is used on said reel, and parallel ridge means for engaging said sides of said reel located on said under surface of said strip and extending between said portions of said strip.

BRIEF DESCRIPTION OF THE DRAWINGS

Because of the nature of the present invention it is best more fully explained with reference to the accompanying drawings in which:

FIG. 3 is a bottom plan view showing terminal portions adjacent to the ends of the reel cover illustrated in FIG. 1 prior to these ends being assembled together;

FIG. 4 is a partial side elevational view of a reel cover as shown in FIG. 1 at an enlarged scale showing the terminal portions of it as they appear when assembled together; and FIG. 5 is a partial cross-sectional view taken at line 5—5 of FIG. 4.

Figure 1:
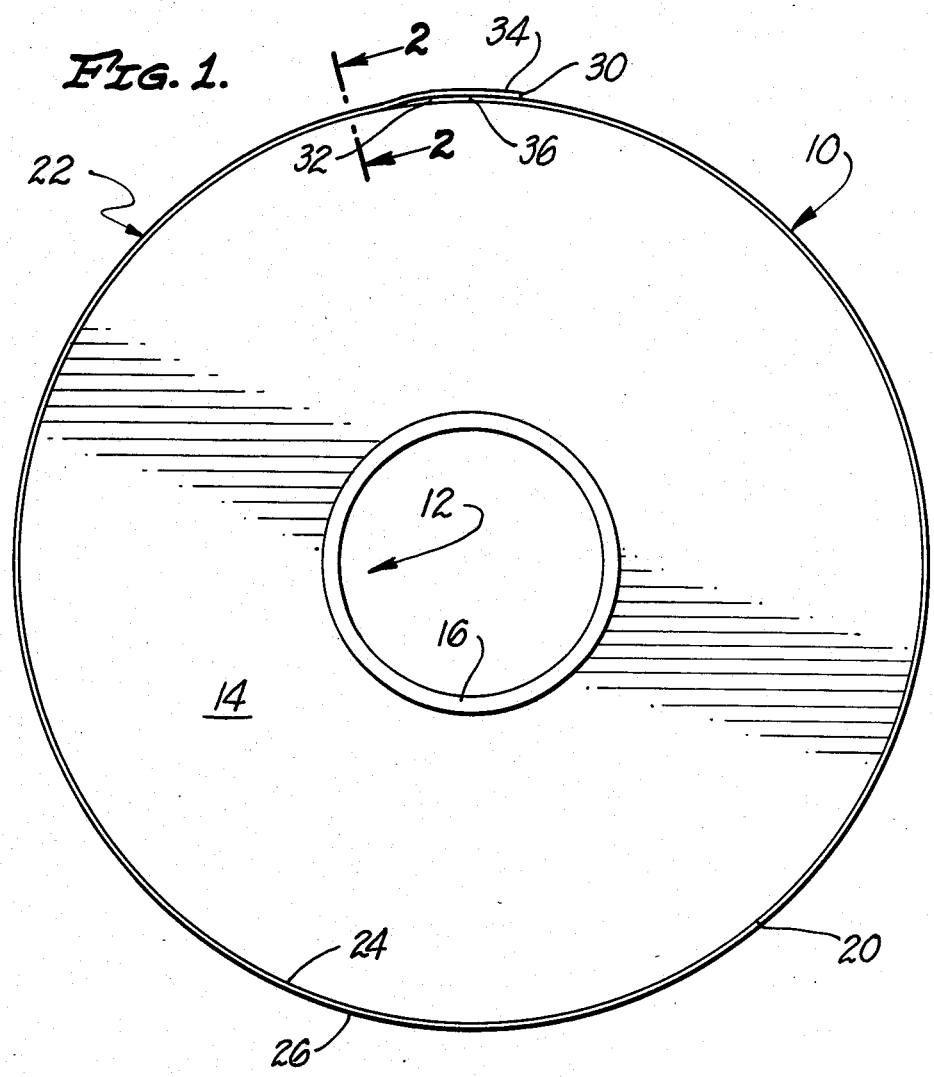
FIG. 1 is a side elevational view of a reel equipped with a presently preferred embodiment or form of a reel cover in accordance with this invention.

The particular reel cover illustrated in the drawings embodies the operative concepts or principles of the invention set forth and defined in the appended claims. Those skilled in the art of forming and utilizing various types of protective retaining bands will realize that these particular concepts or principles may be easily embodied within a variety of some what differently appearing, somewhat differently constructed covers through the use or exercise of routine engineering skill in the noted field. For this reason the accompanying drawings are not to be considered as limiting the invention.

DETAILED DESCRIPTION

In the accompaying drawings there is shown a reel cover 10 in accordance with this invention in use upon a conventional reel 12. This reel 12 includes flat, parallel disk-like imperforate sides 14 which are connected together in axial alignment with one another through the use of a conventional imperforate hub or hub-like structure 16. The cover 10 is utilized in order to enclose the space or gap 18 generally between the peripheries 20 of the sides 14 of the reel 12.

This cover 10 is preferably formed as a unitary body of a conventional flexible, self-supporting polymer material such as plasticized polyvinyl chloride. This particular type of resin composition is considered preferable not only because it has the physical properties indicated but in addition because of the fact that it is somewhat resilient. This is considered to improve the ability of the cover 10 to serve in its intended purpose. It will be recognized that the cover 10 can easily be formed of a number of other known polymer composition having similar or quite closely related physical properties. It is considered especially significant that this cover 10 can be formed by extruding a continuous length of material and then punching it so as to remove material to form the cover 10.

This cover 10 is an elongated strip 22 of a material as noted formed so as to include an under surface 24 adapted to face generally towards the hub 16 of the reel 12 and an outer surface 26 which is adapted to be directed away from the reel 12 as the cover 10 is used. This strip 22 also has parallel side edges 28 and first and second ends 30 and 32 respectively.

This strip 22 is sufficiently long with respect to the peripheries 20 of the sides 14 so that when it is wrapped around the sides 14 as illustrated in FIG. 1 a portion 34 of the strip 22 adjacent to the first end 30 will overlie a corresponding portion of the strip 22 adjacent to the second end 32. Preferably in order to expedite manufacturing and in order to make it possible to utilize either of the ends 30 or 32 in place of the other these two portions 34 and 36 are identical.

Figure 2:
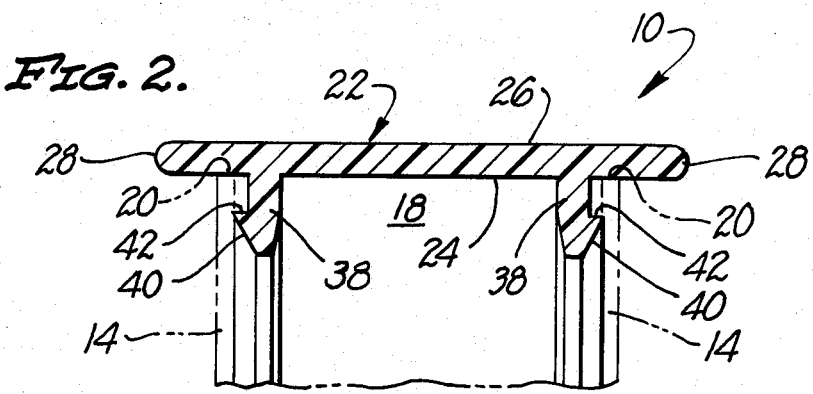
FIG. 2 is a partial cross-sectional view at an enlarged scale taken at line 2—2 of FIG. 1 showing the reel cover in section and indicating the reel with which the cover is used by phantom lines.

As formed the strip 22 preferably includes parallel ridges 38 which are located on the under surface 24 as to extend outwardly therefrom at a right angle. These ridges 38 are preferably small enough so as to be substantially incapable of significantly interfering with the strip 22 being bent so as to conform to the peripheries 20 of the sides 14. These ridges 38 are preferably spaced as indicated in FIG. 2 so that when the cover 10 is used they will fit closely against the sides 14 so as to frictionally hold the strip 22 in place to at least a degree. This is important in minimizing the possibility of contamination getting past the cover 10 into the reel 12.

Although these ridges 38 can be shaped so as to be exposed when the cover 10 is in use it is preferred that they be positioned so as to fit generally within the reel 12 in order to minimize the possibility of their being damaged during handling or the like. Preferably these ridges 38 are shaped as shown so that they are mirror images of one another when viewed together and so as to include sloping terminal walls 40 which are adapted to direct them into place within the sides 14 and extended holding lips 42 abutting these walls 40 which are held under a limited amount of compression when the cover 10 is used. These lips 42 eleviate any need to have the entire ridges 38 abut against the sides 14.

The portions 34 and 36 are preferably formed by punching the strip 22 in order to remove material from both the strip 22 proper and from these ridges 38. This is best seen in FIGS. 3 through 5 of the drawing. As a result of such a punching operation elongated openings 44 corresponding to the thicknesses of the ridges 38 are located in the portions 34 and 36 of the strip 22 and those portions of the ridges 38 which were originally adjacent to these openings are removed from the strip 22. As a consequence of this projections 46, which in reality are separated portions of the ridges 38, are left between the openings 44 and the ends 30 and 32. These projections 46 have the same shape and configuration as the ridges 38 since they were formed from these ridges 38. These projections 46 are preferably approximately the same length as the openings 44 so that the portion 34 of the strip 22 may be positioned over the portion 36 of the strip 22 and so that the two ends 30 and 32 may be secured by the projections 46 on the portion 34 being forced or popped through the openings 44 in the portion 36. Obviously the portion 36 can be located above the portion 34 since the two end portions 34 and 36 are interchangeable.

When these portions 34 and 36 are assembled as noted the under surface 24 on the uppermost portion (the portion 34 in FIGS. 4 and 5) is located against the outer surface 26 on the lowermost portion (the portion 36 in FIGS. 4 and 5). After the cover 10 has been assembled in this manner it may, of course, be removed from a reel 12 by the simple expedient of reversing the steps noted. The enlarged character of the lips 42 is considered to be especially beneficial in preventing undesired dislodgment of the portions 34 and 36 when the cover 10 has been installed on the reel 12.

It is believed that it will be apparent from the preceding that the cover 10 may be easily and conveniently manufactured at a comparatively nominal cost. It is believed that it will be equally apparent that the cover 10 may be easily assembled on or removed from a reel 10 and that it will adequately protect whatever is stored or located on this reel 12 from contamination as the reel 12 is handled and stored.

claim:

1. A reel cover for use in enclosing the periphery of a reel, said reel having aligned circular sides, said reel cover comprising:

an elongated cover strip of a flexible, self-supporting material, said cover strip having an under surface and an outer surface extending between side edges and first and second ends, said cover strip being formed from an elongated extruded strip having a uniform cross-sectional configuration throughout its length.

said cover strip being sufficiently long so that when it is located around said reel a portion of said first end of said cover strip will overlie a portion of said first end of said cover strip with the under surface of said portion of said first end being located against the outer surface of said portion of said second end, parallel ridge means for engaging said sides of said reel located on said undersurface of said cover strip and extending between said portions of said cover strip, said portion of said second end including opening means extending there through between its outer and under surfaces, said opening means being spaced from said second end, said portion of said first end including projection means having the same cross sectional configuration as said ridge means extending from its under surface, said projection means being capable of being fitted within said opening means of said portion of said second end so as to hold said ends with respect to one another when said reel cover is used on said reel, and said opening means being formed by the removal of material from said extruded strip so as to separate said projection means from said ridge means.

2. A reel cover as claimed in claim 1 wherein:

said ridges have sloping terminal wall which serve to direct them into place with respect to the sides of said reel and extended holding lips projecting outwardly therefrom and abutting said sloping walls which are adapted to engage said sides of said reel.

3. A reel cover as claimed in claim 1 wherein:

said portions of said first and said second ends are identical.

4. A reel cover as claimed in claim 3 wherein:

there are two of said projection means on each of said said portions of said ends, said parallel ridge means are of identical cross-sectional configuration, said projection means on said ends are aligned with said ridge means and are spaced from said ridge means by said opening means, said cover includes a separate opening means separating each of said projection means from one of said ridge means.

5. A reel cover as claimed in claim 4 wherein:

said ridge means are of identical cross-sectional configuration and are mirror images of one another when viewed in the same direction, and said ridges have sloping terminal walls which serve to direct them into place with respect to the sides of said reel and extended holding lips projecting outwardly therefrom and abutting said sloping walls which are adapted to engage said sides of said reel.

6. A reel cover as claimed in claim 5 wherein:
said material is resilient.

7. A reel cover as claimed in claim 1 wherein:
said material is a plasticized resilient polyvinyl chloride composition,
said portions of said first and said second ends are identical,
there are two of said projection means on each of said said portions of said ends,
said parallel ridge means are of identical cross-sectional configuration,
said projection means on said ends are aligned with said ridge means and are spaced from said ridge means by said opening means,
said cover includes a separate opening means separating each of said projection means from one of said ridge means,
said ridge means are of identical cross-sectional configuration and are mirror images of one another when viewed in the same direction, and
said ridges have sloping terminal walls which serve to direct them into place with respect to the sides of said reel and extended holding lips projecting outwardly therefrom and abutting said sloping walls which are adapted to engage said sides of said reel.

* * * * *